Figure 1:
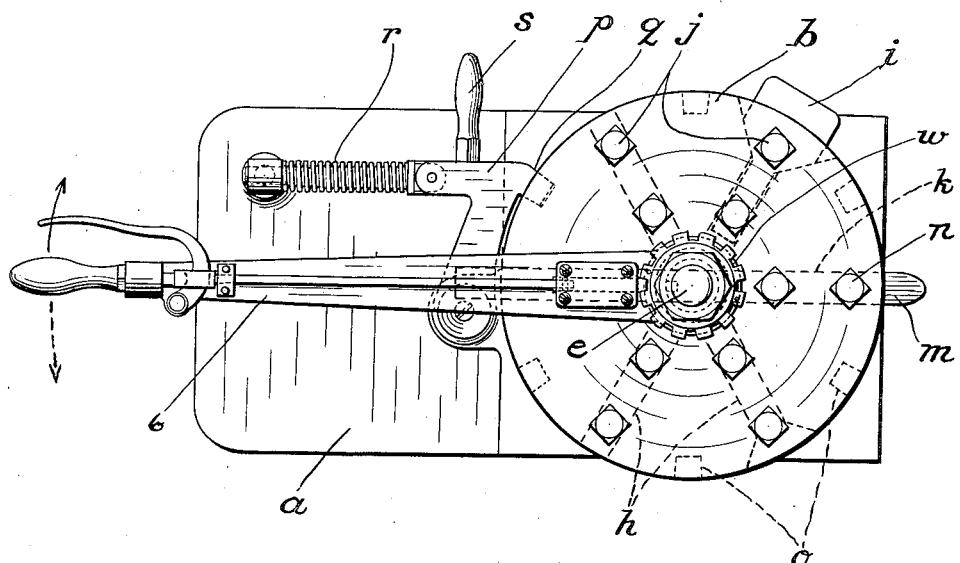

No. 887,985. PATENTED MAY 19, 1908.
L. H. VOLD & J. BURT.
TURRET TOOL REST.
APPLICATION FILED MAR. 23, 1907.

2 SHEETS—SHEET 1.

WITNESSES:

INVENTORS

BY

ATTORNEYS.

No. 887,985. PATENTED MAY 19, 1908.
L. H. VOLD & J. BURT.
TURRET TOOL REST.
APPLICATION FILED MAR. 23, 1907.

2 SHEETS—SHEET 2.

WITNESSES:

INVENTORS

BY

ATTORNEYS.

UNITED STATES PATENT OFFICE.

LARS H. VOLD, OF WESTVILLE, NEW JERSEY, AND JOHN BURT, OF NARBERTH, PENNSYLVANIA, ASSIGNORS TO WILLIAM SELLERS & COMPANY, INCORPORATED, OF PHILADELPHIA, PENNSYLVANIA, A CORPORATION OF PENNSYLVANIA.

TURRET-TOOL REST.

No. 887,985.　　Specification of Letters Patent.　　Patented May 19, 1908.

Application filed March 23, 1907. Serial No. 364,128.

*To all whom it may concern:*

Be it known that we, LARS H. VOLD and JOHN BURT, citizens of the United States, residing, respectively, at Westville and Narberth, counties of Gloucester and Montgomery, and States of New Jersey and Pennsylvania, have invented a new and useful Improvement in Turret-Tool Rests, of which the following is a full, clear, and exact description, reference being had to the accompanying drawings, which form a part of this specification.

The object of the invention is an improved turret tool rest in which a number of tools, having cutting edges, are placed in a desired order for roughing and finishing a surface of specified shape, say, for instance, the flange and tread of a locomotive driving wheel.

The tools are of necessity heavy, and the labor of substituting one for another, often repeated in the course of the work, is a serious loss of time and effort on the part of the operator.

The object of the device, therefore, is to provide a means of bringing the successive tools easily into the desired position, and when there to clamp them in place with sufficient rigidity to withstand the enormously heavy cuts for which they are intended.

Further, it is our object to arrange for one roughing tool which can be easily removed without having to bring the turret to a certain specified position.

It is a further object to arrange for a long roughing tool which may be frequently re-sharpened, and thus avoid wasting material, as would be the case if we used a short roughing tool not susceptible of frequent grinding, since a certain amount of length must be retained for clamping purposes.

It is further an object to form the shank of one or more of the tools and the tool openings of a certain form which fully supports the tool against strains in cutting.

In order to accomplish this result, in the invention one of the tool openings in the turret head extends entirely across the same and through the center clamping bolt, so that a long tool may be used and the tool may be inserted or removed at either end. In carrying out this arrangement the clamping bolt moves or turns with the turret.

We also provide means whereby the same lever which is used to turn the turret, may be used to clamp the turret to the slide.

We will first describe the embodiment of our invention as shown in the accompanying drawing and then specifically point out the invention in the claims.

Figure 2:
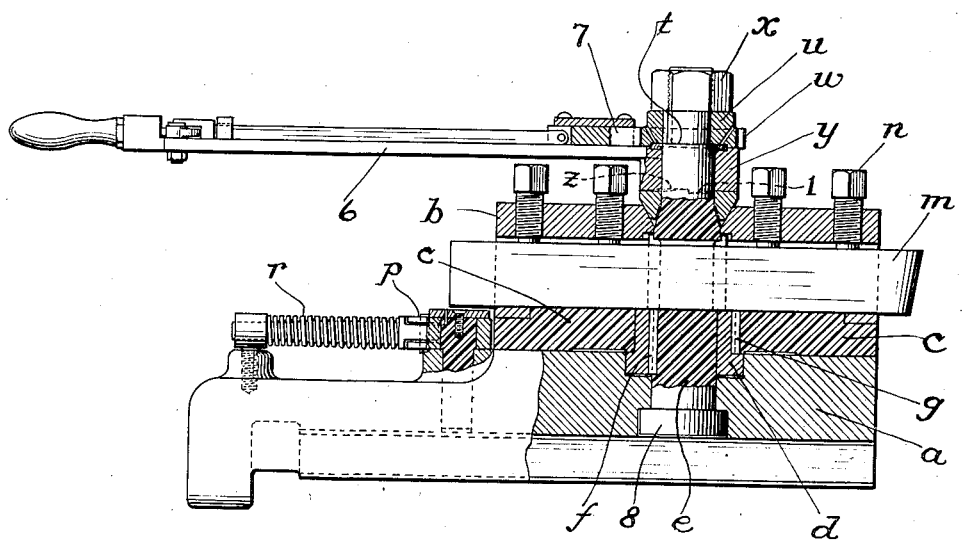
Figure 3:
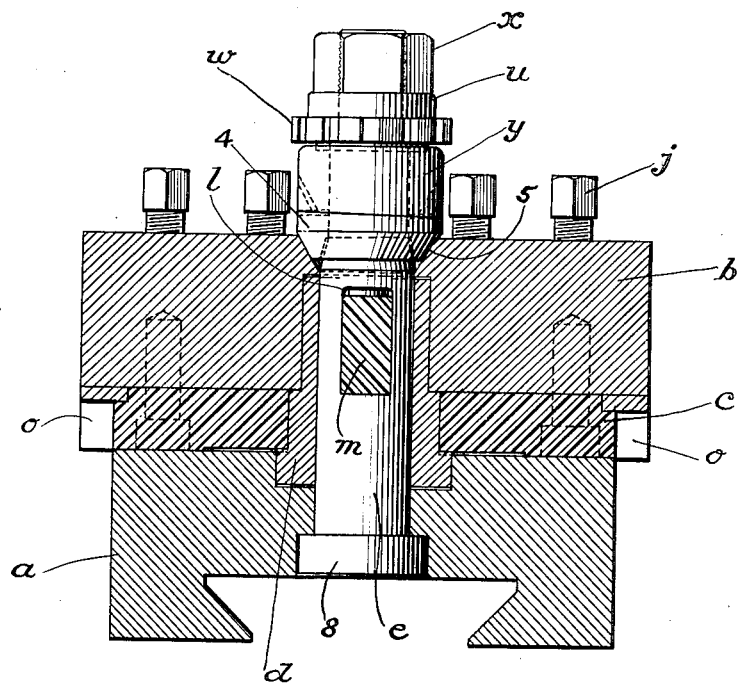
Figure 4:
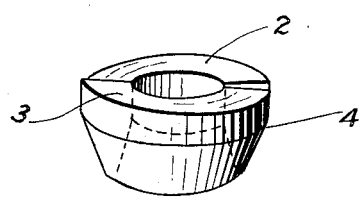
Figure 5:
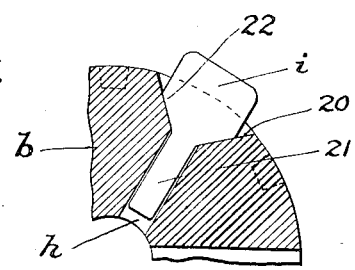

In the drawings: Figure 1 is a plan view of our improved turret. Fig. 2 is a side view partially in section showing also the slide. Fig. 3 is a vertical section through turret at right angles to that shown in Fig. 2. Fig. 4 is a perspective view of cone washer.

$a$ is the slide upon which the turret is mounted. This slide is adjustable to operate to and from the work in the usual manner of a lathe tool slide. The rotating tool holder or turret rest comprises three parts, a head or turret proper $b$, a base $c$ and a bushing $d$. The lower portion of bushing $d$ extends into the top of slide $a$ by which means the axial location of the turret is obtained. The turret proper $b$, the base $c$, and bushing $d$ could be made in one piece. The use of separate pieces is merely to facilitate construction.

$e$ is a bolt extending through the turret, the head 8 of which is in the lower surface of the slide $a$. This bolt is secured to the bushing $d$ by a key $f$, the bushing being secured to base $c$ by key $g$. Thus, as the turret turns, the bolt turns also. By turning the bolt the turret will revolve on the slide $a$ with the bushing $d$ as a center. In the head or turret proper $b$ and spaced around the same are tool openings $h$, which extend from the periphery toward the center. In these openings are placed the forming tools $i$ which are secured therein by the set screws $j$. One or more of these tool openings $h$ are provided with a wedge shaped or flaring mouth 20. The shanks 21 of the tools $i$ placed in such tool openings, have at the end joining the tool a flared or wedge shaped portion 22 corresponding to the mouth 20. The length of the shank should be less than the length of the tool opening $h$ so that the pressure of the tool against the work will tend to wedge the portions 22 and 20 together, holding the tool against the cutting strains. The angles of the flared portion 22 and the mouth 20 are sufficient to prevent binding.

$k$ is a tool opening which extends across the entire face of the head or turret proper $b$, an orifice $l$ in the bolt $e$ being in alinement with tool opening $k$. As the bolt $e$ and turret revolve together the alinement of this orifice $l$ with tool opening $k$ is maintained. In this tool opening, and projecting through the orifice $k$, is placed the long roughing tool $m$, which is clamped therein by means of set screws $n$. On the outer edge of the lower part of turret, are notches $o$ spaced around to correspond with the slots $k$ and $h$.

$p$ is a lever having the projection or pawl $q$ adapted to enter the notches $o$ and thus hold the turret from rotation. A spring $r$ acts on this lever $p$ to hold the pawl $q$ in engagement with the notch. A handle $s$ enables the lever to be swung to withdraw the pawl and allow the turret to be revolved. Upon the bolt $e$ is a shoulder $t$. A sleeve $u$ surrounds the bolt above the shoulder $t$. Upon the periphery of this sleeve are notches $w$. Above this sleeve $u$ is a nut $x$ by which the sleeve may be clamped firmly against the shoulder $t$. The sleeve $u$ is further secured to bolt $e$ by being keyed thereto. Below this sleeve is a hub $y$ surrounding the bolt $e$. On the lower face of this hub $y$ are formed the two helical cam faces $z$ and $1$. These faces correspond with helical faces $2$ and $3$ respectively on the cone washer $4$ below the hub. This cone washer fits in a conical orifice $5$ in the head or turret proper, $b$, the angle of this washer being, preferably, sufficient to free itself when relieved from pressure. Connected to the hub $y$ is the lever $6$ provided with a spring latch $7$, adapted to enter the notches $w$. When this latch is so engaged, a movement of the lever $6$ will cause a rotation of the bolt $e$ and with it the turret. When the latch is released and the lever moved in the direction of the full arrow, Fig. 1, it will, through the action of lever cam faces upon cone cam faces force the hub against the sleeve $u$ lifting the bolt $e$ and clamping its head to the slide and through the cone washer, the turret rest, to the slide. Thus the turret tool rest is firmly clamped to slide $a$. The cone washer biting into the conical orifice in the head or turret proper $b$ overcomes any turning tendency of the conical washer produced by the friction and tangential force on the cam faces.

Taking the parts to be fixed and it be desired to rotate the turret to bring another tool into action. The pawl $q$ is released from notch $o$. The lever $6$ is then moved in the direction of dotted arrow, Fig. 1, which releases the turret from slide $a$. The latch $7$ is then engaged with notch $w$ and the bolt $e$ and turret revolved in either direction until the desired tool is brought into position. When this point is reached, the pawl $q$ is engaged with the corresponding notch $o$. The latch 7 is then released from notch $w$, the lever 6 given a slight turn in direction of full arrow which again clamps the turret upon the slide.

Having now fully described our invention, what we claim and desire to protect by Letters Patent is:

1. In combination, a turret tool rest, a slide, a clamping bolt revoluble with and passing centrally through said turret tool rest, said bolt being rotatably connected with said slide, the turret head of said turret tool rest being provided with a tool opening extending entirely across the head, there being an orifice through the bolt in alinement with said opening.

2. In combination, a tool holder provided with a tool opening, the mouth of which is flared, the remainder of the tool opening not being flared, and a tool, the shank of which at the juncture with the tool proper, is flared correspondingly to the mouth of the tool opening, the remainder of the shank not being flared the angle of the flare of the tool opening and tool shank being sufficient to prevent binding.

3. In combination, a tool holder provided with a tool opening, the mouth of which is flared, the remainder of the tool opening not being flared, and a tool, the shank of which at the juncture with the tool proper is flared correspondingly to the mouth of the tool opening, the remainder of the shank not being flared, the length of the tool opening being greater than the length of the shank the angle of the flare of the tool opening and tool shank being sufficient to prevent binding.

4. In combination, a turret tool rest, a slide upon which said turret tool rest is rotatably mounted, a lever, means to connect and disconnect said lever and said turret to rotate the turret tool rest in either direction, and clamping mechanism to clamp the turret to the slide, said clamping mechanism being inactive when said lever and tool rest are connected, and means whereby, when the lever is disconnected from the turret tool rest, said lever in its rotation operates said clamping mechanism.

5. In combination, a turret tool rest, a slide upon which said turret tool rest is rotatably mounted, a clamping bolt rotatable with said turret tool rest, clamping mechanism loosely surrounding said bolt adapted when moved independent of the tool rest to move said bolt to clamp, a lever normally connected with a member of said clamping mechanism, and means to positively connect and disconnect said lever and tool rest.

6. In combination, a turret tool rest, a slide upon which said turret tool rest is rotatably mounted, a clamping bolt rotatable with said turret tool rest and seated in said slide, a sleeve provided with notches secured to said bolt, a lever, carrying a latch adapted to engage said notches, loosely mounted on said bolt below said sleeve, a cam part surrounding said bolt connected with said lever, and a cam part, loose upon said bolt, adapted to be acted on by said lever cam part, and adapted to lift the lever cam part, and with it the bolt clamping said bolt to the slide, said turret forming an abutment for said cam part.

7. In combination, a turret tool rest, a slide upon which said turret tool rest is rotatably mounted, a bolt rotatable with said turret tool rest and seated in said slide, a sleeve, provided with notches, secured to said bolt, a lever, carrying a latch adapted to engage said notches, loosely mounted on said bolt, below said sleeve, a cam surface surrounding said bolt, connected with said lever, a cone washer upon said bolt having a cam surface coacting with the lever cam surface, and adapted to lift the lever cam surface, and a conical orifice in the turret in which said cone washer is adapted to enter.

8. In combination, a turret tool rest, a slide upon which said turret tool rest is rotatably mounted, a bolt rotatable with said turret tool rest and seated in said slide, a sleeve, secured to said bolt, a lever, means to connect and disconnect said lever and sleeve a hub connected to said lever surrounding said bolt below said sleeve, the lower face of said hub having a cam surface, a washer, having a cam surface, adapted to coact with the lever hub cam surface when the lever is disconnected from the sleeve and lift the bolt to clamp, said turret tool rest forming an abutment for said cam surface.

9. In combination, a turret tool rest, a slide upon which said turret tool rest is rotatably mounted, a bolt rotatable with said turret tool rest and seated in said slide, a sleeve, secured to said bolt, a lever, a hub connected to said lever surrounding said bolt below said sleeve, the lower face of said hub having a cam surface, a cone washer having a cam surface adapted to coact with the lever a cam surface adapted to coact with the lever hub cam surface, and a conical orifice in the turret in which said cone washer is adapted to enter.

10. In combination, a turret tool rest, a slide upon which said turret tool rest is rotatably mounted, a bolt rotatable with said turret and seated in said slide, a lever loosely connected to said bolt, means to positively connect and disconnect said lever and turret tool rest to rotate the turret tool rest in either direction, and means whereby said lever, in its rotation when disconnected from the bolt, lifts said bolt and clamps the turret to the slide.

11. In combination, a turret tool rest, a slide upon which the turret tool rest is rotatably mounted, a bolt rotatable with said turret tool rest, and seated in said slide, a lever, means to connect and disconnect said lever and said bolt, a cam part surrounding said bolt and connected with said lever, a cam part loose upon said bolt and adapted to act upon said lever cam part, when said lever is disconnected from said bolt, means, effective during said action to resist the rotation of the loose cam part, and means effective when said lever cam part is lifted to lift the said bolt and clamp the turret tool rest to the slide.

12. In combination, a turret tool rest, a slide upon which said turret tool rest is rotatably mounted, a bolt rotatable with said turret tool rest, and seated in said slide, a lever loosely connected to said bolt, a cam surface surrounding said bolt and connected with said lever, and a cone washer upon the bolt, having a cam surface coacting with the lever cam surface, and adapted to lift said lever cam surface, and means on said bolt engaging said lever and effective when said lever cam surface is lifted to lift said bolt and clamp the turret to the slide, and a conical orifice in the turret in which said cone washer is adapted to enter.

13. In combination, a turret tool rest, a slide upon which said turret tool rest is rotatably mounted, a bolt rotatable with said turret tool rest and seated in said slide, a lever, means to positively connect and disconnect said lever and turret tool rest to rotate said turret tool rest in either direction, a hub connected to said lever surrounding the bolt, the lower face of said hub having a cam surface, a washer having a cam surface adapted when said lever is disconnected from the said turret tool rest to coact with the lever hub cam surface and lift said hub, and means when said hub is lifted to lift said bolt and clamp the turret tool rest to the slide.

14. In combination, a turret tool rest, a slide upon which said turret tool rest is rotatably mounted, a bolt rotatable with said turret tool rest and seated in said slide, a lever, a hub connected to said lever surrounding said bolt, the lower face of said hub having a cam surface, a cone washer having a cam surface adapted to coact with the lever hub cam surface and lift said hub, means on said bolt engaging said lever and effective when said hub is lifted to lift said bolt and clamp the turret tool rest to the slide, and a conical orifice in said turret tool rest in which said cone washer is adapted to enter.

15. In combination, a tool holder provided with a tool opening, having a portion of equal width throughout and having a flaring mouth, and a tool, the shank of which, remote from the tool proper, is of equal width and corresponding to the portion of the tool opening of equal width, and the shank at the juncture of the tool proper being flared correspondingly to the mouth of the tool opening.

In testimony of which invention, we have hereunto set our hands, at Philadelphia, on this 19th day of March, 1907.

LARS H. VOLD.
JOHN BURT.

Witnesses:
HELEN FAHNESTOCK,
FRANK G. GRIER.